United States Patent [19]

Rifi

[11] Patent Number: 4,560,731

[45] Date of Patent: Dec. 24, 1985

[54] PREPARATION OF ELASTOMERIC, CHLOROSULFONATED ETHYLENE POLYMERS

[75] Inventor: Mahmoud R. Rifi, Kendall Park, N.J.

[73] Assignee: Union Carbide Corporation, Danbury, Conn.

[21] Appl. No.: 608,874

[22] Filed: May 14, 1984

Related U.S. Application Data

[63] Continuation-in-part of Ser. No. 514,337, Jul. 15, 1983, abandoned.

[51] Int. Cl.⁴ .............................................. C08F 8/38
[52] U.S. Cl. ................................. 525/344; 525/333.9
[58] Field of Search ............................. 525/344, 333.9

[56] References Cited

U.S. PATENT DOCUMENTS

| | | | |
|---|---|---|---|
| 2,890,213 | 6/1959 | Noeske | 525/356 |
| 2,972,604 | 2/1961 | Reynolds | 525/344 |
| 2,994,688 | 8/1961 | King | 525/344 |
| 3,079,362 | 2/1963 | Nersasian | 525/344 |
| 3,314,925 | 4/1967 | King | 525/344 |
| 3,347,835 | 10/1967 | Lorenz | 525/344 |
| 3,542,746 | 11/1970 | Eckardt et al. | 525/344 |
| 3,624,054 | 11/1971 | Barton et al. | 525/344 |
| 3,770,706 | 11/1973 | Walles | 525/344 |
| 4,011,379 | 3/1977 | Bow et al. | 525/356 |
| 4,029,850 | 6/1977 | Ishii et al. | 428/518 |
| 4,029,862 | 6/1977 | Liu et al. | 525/356 |
| 4,144,289 | 3/1979 | Watanabe et al. | |
| 4,145,491 | 3/1979 | Ryan | 525/344 |
| 4,220,739 | 9/1980 | Walles | 525/344 |
| 4,452,953 | 6/1984 | Benedikt | 525/344 |

FOREIGN PATENT DOCUMENTS 1385778  2/1975  United Kingdom .

*Primary Examiner*—Christopher A. Henderson
*Attorney, Agent, or Firm*—James C. Arvantes; Robert C. Brown

[57] ABSTRACT

A process of modifying ethylene polymers by reacting granular ethylene polymers having a density of about 0.87 to about 0.93 gram per cc and a pore volume of about 0.1 to about 1 cc per gram with a gaseous chlorosulfonating agent to produce elastomeric, granular, chlorosulfonated polymers having a tensile modulus of less than about 2,000 psi and a crystallinity of less than about 10 percent.

12 Claims, No Drawings

4,560,731

PREPARATION OF ELASTOMERIC, CHLOROSULFONATED ETHYLENE POLYMERS

This application is a continuation-in-part of my co-pending application, Ser. No. 514,337, filed July 15, 1983, now abandoned.

SUMMARY OF THE INVENTION

This invention relates to the modification of ethylene polymers by reacting, in the absence of solvent or diluent, a granular ethylene polymer, having a density of about 0.87 to about 0.93 gram per cc and a pore volume of about 0.1 to about 1 cc per gram with a gaseous chlorosulfonating agent to produce a granular, elastomeric, chlorosulfonated polymer having a tensile modulus of less than about 2,000 psi and a crystallinity of less than about 10 percent. The elastomeric polymers so produced can be cured to crosslinked products which are useful in the production of film material, as extrudates about wires and cables and as the base polymers in flame retardant compositions.

BACKGROUND OF THE INVENTION

Elastomeric, chlorosulfonated ethylene polymers are commercially attractive, as once cured to crosslinked products, they are characterized by a number of desirable properties, including (a) resistance to chemical solvents (b) resistance to ozone (c) resistance to abrasion (d) resistance to outdoor weathering and (e) by excellent use temperatures, i.e. flexibility over a temperature range of about $-20°$ C. to about $120°$ C. Consequently, cured chlorosulfonated ethylene polymers and compositions based thereon, characterized by the properties described above, find uses in many diverse applications including production of film material, as extrudates about wires and cables and as base polymers in flame retardant compositions.

The preparation of chlorosulfonated ethylene polymers has been carried out, in the past, by a solution process wherein the polymers have been reacted with a chlorosulfonation agent, while in a solvent medium. The so-called solution process requires that the solvent be removed from the chlorosulfonated polymer at the completion of the reaction, generally by heating the reacted system at temperatures sufficiently high to drive off the solvent. At the temperatures employed for solvent removal, however, the chlorosulfonated polymer tends to agglomerate and become difficult to handle and process.

It has also been proposed to chlorosulfonate ethylene polymers by a process which involves reacting the polymer with a gaseous chlorosulfonating agent. This process has not been found to be particularly successful as the ethylene polymers have been heterogeneously chlorosulfonated. As pointed out in U.S. Pat. No. 3,347,835, cured products obtained from such chlorosulfonated ethylene polymers have been characterized by inferior properties.

DESCRIPTION OF THE INVENTION

The present invention provides for the chlorosulfonation of ethylene polymers by a process which avoids the use of solvents and diluents and their attendant disadvantages and results in the production of granular, elastomeric, ethylene polymers which have been homogeneously chlorosulfonated, as evidenced by an excellent balance of properties. Also, by reason of their granular nature, the chlorosulfonated ethylene polymers of this invention are easy to handle and process.

The results of the present invention are achieved by reacting, in the absence of diluents and/or solvents, a gaseous chlorosulfonating agent with a granular ethylene polymer having a density of about 0.87 to about 0.93 gram per cc, preferably a density of about 0.89 to about 0.91 gram per cc and a pore volume of about 0.1 to about 1 cc per gram, generally about 0.1 to about 0.5 cc per gram and preferably about 0.2 to about 0.4 cc per gram to produce a granular, elastomeric, chlorosulfonated polymer, that is a chlorosulfonated polymer having a tensile modulus of less than about 2,000 psi and a crystallinity of less than about 10 percent.

The chlorosulfonated ethylene polymers so produced, being homogeneously chlorosulfonated and "elastomeric" are characterized by an excellent balance of properties, comparable to commercially available, solution prepared, chlorosulfonated ethylene polymers.

Ethylene polymers suitable for purposes of the present invention, having the density and pore volume previously described, are ethylene-$C_3$ to $C_8$ alpha olefin polymers produced by reacting ethylene with at least one alpha monoolefin under low pressures as further described in U.S. Pat. No. 4,302,565 to George L. Goeke et al patented Nov. 24, 1981, and in application Ser. No. 480,296 filed Mar. 29, 1983 assigned to a common assignee.

Particularly desirable ethylene polymers for purposes of the present invention have the density and pore volume described and contain about 50 to about 99 and preferably about 75 to about 96 mole percent ethylene; and about 1 to about 50, preferably about 4 to about 25 mole percent of at least one $C_3$ to $C_8$ alpha monoolefin such as propylene, butene-1, pentene-1, 4-methylpentene-1, hexene-1, heptene-1 and octene-1.

Even more desirable ethylene polymers to be chlorosulfonated according to the present invention have:

an average particle size of about 200 to about 1,500, preferably about 300 to about 1,000 microns, a bulk density of about 10 to about 30, preferably about 15 to about 24, a pore volume (porosity) of about 0.1 to about 1, generally about 0.1 to about 0.5 and preferably about 0.2 to about 0.4, cc/gram, and a density of about 0.87 to about 0.93, preferably about 0.89 to about 0.91, gram/cc.

The time of treatment with gaseous chlorosulfonating agents is sufficient to obtain a chlorosulfonated ethylene polymer having a tensile modulus of less than about 2,000 psi and a crystallinity of less than about 10 percent, preferably a crystallinity of 0 to about 5 percent, generally having a total chlorine content of about 5 to about 55 percent by weight, preferably about 15 to about 40 percent by weight and having a sulfur content of about 0.1 to about 10 percent by weight, preferably about 0.5 to about 5 percent by weight.

This treatment is believed to result in the replacement of hydrogen atoms on the backbone of the ethylene polymers with Cl and $SO_2Cl$ groups.

The actual time of treatment generally varies from about 3 to about 10 hours, depending upon the particular ethylene polymer being chlorosulfonated, the chlorosulfonating agent being used and the temperature and pressure being employed.

Generally, suitable temperatures are in the range of about $50°$ C. to about $130°$ C., preferably about $50°$ C. to about $100°$ C. The pressure under which the reaction is conducted can range from atmospheric pressure to a pressure of about 1,000 psi, provided that none of the reactants or by-products condense under the reaction conditions employed. As a rule, the higher the temperature and pressure, the shorter the reaction time.

In carrying out the reaction, the amount of chlorosulfonating agent used, e.g. sulfuryl chloride or mixture of sulfur dioxide and chlorine, is about 10 to about 200 percent by weight, preferably about 20 to about 100 percent by weight based on the weight of the ethylene polymer being treated. In those instances wherein a mixture of $SO_2$ and $Cl_2$ is used as the reactant or modifying agent, the mole ratio of $Cl_2$ to $SO_2$ is about 5:1 to 10:1, preferably about 5:1.

If desired, an inert gas such as nitrogen may be used in conjunction with the gaseous modifying agents, serving as a fluidizing agent, a diffusion aid and/or as a heat sink.

The properties noted herein were determined by the following test methods:

| | |
|---|---|
| Density (gram/cc) | ASTM-D-1505 - A plaque was made and conditioned for one hour at 100° C. to approach equilibrium crystallinity. Measurement for density was then made in a density gradient column. |
| Pore Volume (cc/gram) | ASTM-0-699-108 (45) |
| Average Particle Size (microns) | Calculated from sieve analysis data measured according to ASTM-D-1921 Method A, using a 500 gram sample. Calculations were based on weight fractions retained on the screens. |
| Bulk Density | Polymer was poured via 3/8 diameter funnel into a 100 ml. graduated cylinder to the 100 ml. line without shaking the cylinder. Bulk density was determined based on the difference in weight between the unfilled cylinder and the filled cylinder. |
| Crystallinity (percent) | Measured by Differential Scanning Calorimeter (DSC) using a duPont-990 analyzer with a pressure DSC cell. |
| Tensile Modulus (psi) | A film, 4 inches by 4 inches by 0.020 inch, was compression molded at a temperature of 130° C.-150° C. and its one percent secant modulus measured according to ASTM-D-638. |
| Tensile Strength (psi) | A film, prepared as described for the Tensile Modulus Test, was tested according to ASTM-D-638. |
| Percent Elongation at Break | A film, prepared as described for the Tensile Modulus test, was tested according to ASTM-D-638. |

The following Examples are provided to illustrate the present invention and are not intended to limit the scope thereof.

Unless otherwise indicated, the ethylene polymers used as the starting materials in the Examples were prepared by the process disclosed in U.S. application Ser. No. 480,296, filed Mar. 29, 1983, assigned to a common assignee, the disclosure of which is incorporated herein by reference.

Apparatus/Process

The ethylene polymers were chlorosulfonated in a two liter glass lined stainless steel or Hastelloy (55% Ni, 17% Mo, 16% Cr, 6% Fe and 4% W) reactor equipped with a thermocouple and a motor activated U-shaped Hastelloy stirrer.

A Hastelloy dip tube (~2 cm in diameter) was used to feed the gaseous modifying agents into the reactor. Unreacted modifying agents and HCl were vented to a collection trap containing 25 percent aqueous NaOH. The gaseous modifying agents were fed at the rate of 8 to 15 grams/hour for $Cl_2$ and at the rate of 2 to 3 grams/hour for $SO_2$ under a pressure of about 15 to about 450 psi. The polymer to be treated, about 200 to about 1,000 grams, was charged to the reactor and heated therein by an external heater. No catalysts were used in carrying out these examples.

After the polymer was added to the reactor and heated to the desired reaction temperature, the polymer was agitated by the stirrer and the gaseous modifying agents were fed in. During the course of the modifying process, samples of the modified polymers were taken from the reactor and tested for sulfur and chlorine content, and percent crystallinity. At the completion of the reaction, the flow of gaseous modifying agents was terminated and the product was allowed to cool in the reactor while the reaction vessel was purged with nitrogen to remove unreacted $SO_2$ and/or $Cl_2$ and HCl by-product.

Three granular, low density ethylene-butene-1 copolymers, A, B and C, were chlorosulfonated in accordance with the present invention. The polymers had the following properties:

| | A | B | C |
|---|---|---|---|
| Density, gm/cc | 0.926 | 0.895 | 0.875 |
| Mole % butene-1 in copolymer | 2.4 | 9.4 | 20 |
| Crystallinity, percent | 50 | 24 | 13 |
| Particle size, microns (average) | 400 | 500 | 400 |
| Pore Volume, cc/gm | 0.3 | 0.36 | 0.37 |
| Bulk Density | 27 | 21 | 21 |
| Tensile Modulus, psi | 45,300 | 8,800 | 1,160 |
| Tensile Strength, psi | 2,190 | 1,840 | 290 |
| Elongation, percent | 490 | 1,155 | 920 |

The ethylene polymers were chlorosulfonated by reaction with a gaseous mixture of $SO_2$ and $Cl_2$ for about 3 to 10 hours at a temperature of 60° C. to 100° C. to produce chlorosulfonated polymers having properties set forth in Table 1.

Polymer A was prepared according to the process disclosed in U.S. Pat. No. 4,302,565.

TABLE 1

| | Example 1 (Polymer A) | Example 2 (Polymer B) | Example 3 (Polymer C) | Control 1 Commercially available chlorosulfonated polyethylene (HYPALON)* |
|---|---|---|---|---|
| Chlorine, percent | 30 | 15 | 12 | 27-35 |
| Sulfur, percent | 2.4 | 1.2 | 1.1 | 0.9-1.4 |
| Crystallinity, percent | 0 | 4.7 | 2.7 | <2 |
| Tensile Modulus, psi | 950 | 920 | 380 | <500 |

TABLE 1-continued

|  | Example 1 (Polymer A) | Example 2 (Polymer B) | Example 3 (Polymer C) | Control 1 Commercially available chlorosulfonated polyethylene (HYPALON)* |
|---|---|---|---|---|
| Tensile Strength, psi | 390 | 820 | 320 | 400–500 |
| Elongation, percent | 1,925 | 680 | 890 | — |

*Registered trademark of E.I. duPont de Nemours

The data of this Table indicate that elastomers, produced in accordance with the present invention, have properties comparable to a commercially available chlorosulfonated polymer.

In order to further demonstrate the necessity of utilizing an ethylene polymer having the density and pore volume previously described, a "Control" was carried out using a granular, ethylene-butene-1 copolymer having a density of 0.935 gm/cc and a pore volume of about 0.3 cc/gm.

This copolymer was chlorosulfonated in a manner previously described with respect to Example 1, using a mixture of gaseous sulfur dioxide and chlorine. The chlorosulfonation was carried out for a period of eight hours at a temperature of about 80° C.–100° C. At the end of the eight hour period, the chlorosulfonated product was analyzed and its properties determined.

|  | Control 2 |
|---|---|
| Chlorine, percent | 20 |
| Sulfur, percent | 0.3 |
| Crystallinity, percent | 37 |
| Tensile Modulus, psi | ~30,000 |

The chlorosulfonated polymer was not an elastomeric product as evidenced by its "high" modulus and crystallinity.

The polymer of Control 2 was prepared according to the process disclosed in U.S. Pat. No. 4,302,565.

Chlorosulfonated ethylene polymers of this invention can be cured to crosslinked products as described in U.S. Pat. No. 3,542,746, patented Nov. 24, 1970.

What is claimed is:

1. A process of chlorosulfonating an ethylene polymer which consists essentially of reacting, in the absence of solvent or diluent, a granular ethylene-$C_3$ to $C_8$ alpha olefin polymer having a density of about 0.87 to about 0.93 gram per cc and a pore volume of about 0.1 to about 1 cc per gram and containing about 2.4 to about 20 mole percent said alpha olefin, with a gaseous chlorosulfonating agent to produce an elastomeric, granular, chlorosulfonated ethylene polymer having a tensile modulus of less than about 2,000 psi and a crystallinity of less than about 10 percent.

2. A process as defined in claim 1 wherein said polymer has a density of about 0.89 to about 0.91 gram per cc and a pore volume of about 0.2 to about 0.4 cc per gram.

3. A process as defined in claim 1 wherein the chlorosulfonating agent is gaseous sulfuryl chloride.

4. A process as defined in claim 1 wherein the chlorosulfonating agent is a gaseous mixture of sulfur dioxide and chlorine.

5. A process as defined in claim 1 wherein the said polymer is a polymer of ethylene and butene-1.

6. A process as defined in claim 1 carried out at a temperature of about 50° C. to about 130° C.

7. A process as defined in claim 1 wherein the ethylene polymer has the following properties:
an average particle size of about 200 to about 1,500,
a bulk density of about 10 to about 30,
a pore volume of about 0.1 to about 1, and
a density of about 0.87 to about 0.93.

8. A process as defined in claim 1 wherein the said polymer has a pore volume of about 0.1 to about 0.5 cc per gram.

9. A process as defined in claim 1 wherein the said polymer is a polymer of ethylene and butene-1 having a density of 0.926.

10. A process as defined in claim 1 wherein the said polymer is a polymer of ethylene and butene-1 having a density of 0.895.

11. A process as defined in claim 1 wherein the said polymer is a polymer of ethylene and butene-1 having a density of 0.875.

12. A process as defined in claim 5 wherein the said polymer has a density of 0.875 to 0.926.

* * * * *